Patented Jan. 6, 1942

2,268,586

UNITED STATES PATENT OFFICE 2,268,586

PREPARATION OF POLYAMIDES

Lucius Gilman, Arden, Del., assignor to E. I. du Pont de Nemours & Company, Wilmington, Del., a corporation of Delaware No Drawing. Application July 6, 1939, Serial No. 283,123

9 Claims. (Cl. 260—2)

This invention relates to polymeric materials and more particularly to fiber-forming synthetic linear polymers.

The synthetic linear polymers referred to above are of the polyamide type described in Patents 2,071,250, 2,071,253 and 2,130,948 in which the linear polymer constituent may comprise either the simple polyamide, the amide interpolymers, and in general polymers containing the amide group

these groups being joined in the chain by divalent organic radicals. These polymers, which are crystalline in structure, may be formed into filaments which can be cold drawn into fibers showing molecular orientation along the fiber axis. In the prior preparation of these polymers from the preferred type of reactants, which in most instances yield by-products, the by-products are those such as water or alcohol which must be removed to obtain a high degree of polymerization but which offer some difficulties in removal since they are not so volatile as is desirable.

This invention has as an object a new and improved method of making linear polymers containing the amide linkage

or its sulfur analog, in the linear chain of the molecule. A further object is the preparation of such polymers without the formation of by-products which upon further heating in contact with the product would readily react to lower the degree of polymerization. A still further object of this invention is the preparation of polyamides possessing film- and fiber-forming properties. Other objects will appear hereinafter.

These objects are accomplished by the methods more fully described below which comprise heating a polyamide-forming composition comprising essentially reacting material in which each molecule has two and only two amide-forming groups, each of which is complementary to one of the amide-forming groups in other molecules, these groups being carboxyl, isocyanate and isothiocyanate groups.

It is to be understood that the term "polyamide" as used herein includes not only the simple polyamides and interpolyamides but also the linear interpolymers, such as the esteramides, which contain other groups in addition to the amide groups.

Thus the polyamide-forming composition may comprise two different reactants wherein each of the two said amide-forming groups on the molecules of one reactant are complementary to one of the two groups on the molecule of the other reactant, as for instance the reaction of a dibasic carboxylic acid with a diisocyanate or a diisothiocyanate. These last two mentioned compounds may be expressed as XCNR'NCX where X is oxygen or sulfur and R' is a divalent organic radical. In the case of the diisocyanate the reaction is:

HOOCRCOOH+OCNR'NCO⟶

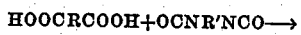

wherein R and R' are divalent organic radicals which may be the same or different. When the diisothiocyanate is used, the above reaction differs only in that the by-product is COS. Similarly, the polyamide indicated may be obtained from compounds of the type OCNR'NCS.

The above defined polyamide-forming composition may also comprise or consist of a single material in which the two amide-forming groups on each molecule are complementary. Compounds of this type in which the molecules condense to form polymers containing the group

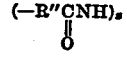

are isocyano- or isothiocyano-monocarboxylic acids which are indicated by the formulae OCNR''COOH and SCNR''COOH and generally by the formula XCNR''COOH where X is oxygen or sulfur and R'' is a divalent organic radical. The radicals R, R' and R'' are preferably hydrocarbon radicals.

In applying this invention to the preparation of polyamides of the diamine-dibasic acid type, i. e. those described in U. S. 2,130,948, substantially chemically equivalent quantities of a dibasic carboxylic acid and a diisocyanate or a diisothiocyanate are heated at reaction temperature for such a length of time that a degree of polymerization is attained resulting in polymers having the desired properties. It is preferred to operate by mixing the reactants at room temperature and subsequently heating the mixture for 4 to 10 hours at temperatures ranging from 100° C. to 200° C. and finally for from 15 minutes to 2 hours at temperatures above the melting point of the polymer, say at from 200° C. to 280° C. Heating may be done in an open or closed system, but is preferably done in the presence of an inert atmosphere such as nitrogen. When the reaction is conducted in a closed system it is desirable but not essential to allow the evolved gases access to some part of that system which is at a sufficiently low temperature to cause these gases to be partially or totally condensed. This procedure hastens the reaction and reduces operating pressures.

The following examples, in which the quantities of reagents are parts by weight, are illustrative of the above methods for preparing linear polymers.

*Example I*

This example illustrates the preparation of a fiber-forming polyamide or superpolyamide from the monomeric reactants.

To 69.40 parts of adipic acid is added 95.15 parts of hexamethylene diisothiocyanate in an atmosphere of dry nitrogen. These are heated 6 hours at 135° C., 3 hours at 175° C., and finally 20 minutes at 280° C. The polymer is a light brown solid melting, in a sealed tube, at 259° C. Known polyhexamethyleneadipamide melts at 260° C. under the same conditions. The product of the condensation has an intrinsic viscosity, as defined in U. S. 2,130,948, of 1.14, and, when molten, can be drawn out into a filament by touching the molten mass with a cold rod and withdrawing the rod. The filaments can be cold drawn into oriented fibers. Both the drawn and undrawn filaments show considerable strength.

Anal. calc'd. for $[C_{12}H_{22}O_2N_2]_x$: N, 12.38. Found: N, 12.37.

The hexamethylene diisothiocyanate used in the above example was prepared as follows: To 300 parts of hexamethylenediamine and 291 parts of potassium hydroxide dissolved in 3000 parts of water is added dropwise with stirring 394 parts of carbon disulfide at 20–30° C. When reaction is complete, as indicated by complete solution of the carbon disulfide, 610 parts of chloroethyl carbonate is added with stirring at 0–5° C. The product is removed by extraction with chloroform, dried with calcium chloride, and is distilled (B. P. 153° C. under 1 mm. pressure) from an ordinary Claisen flask, the low boiling chloroform being collected separately. Distillation is carried out as rapidly as possible since prolonged heating at these temperatures causes extensive decomposition. The yield of distilled product is 60% of the theoretical amount. This material contains 30.69% sulfur as compared with 32.02% calculated for hexamethylene diisothiocyanate. Two such runs are combined and recrystallized in batches by cooling 35 parts of distilled hexamethylene diisothiocyanate in 50 parts of absolute ether to −60° C. The residual ether is removed from the combined recrystallized batches by heating at 50° C. for 2 hours under 1 mm. pressure. The yield is 208 parts (20% of the theoretical amount) of almost colorless hexamethylene diisothiocyanate melting at 2° C. and having a refractive index of 1.5668 (D line of sodium) at 25° C.

*Example II*

This example illustrates the preparation of a polyamide of a lower degree of polymerization than that of the preceding example.

To 42.66 parts of adipic acid is added 57.16 parts of hexamethylene diisothiocyanate in an atmosphere of dry nitrogen. These are heated for 3 hours at 115° C., during which time the reactants dissolve to form a homogeneous solution with considerable gas evolution. The reaction mixture then solidifies. The product is heated 1 hour at 130–170° C. without melting. It then has an intrinsic viscosity, as determined in meta-cresol, of 0.45.

Anal. calc'd. for $[C_{12}H_{22}O_2N_2]_x$: N, 12.38. Found: N, 12.10.

*Example III*

This example illustrates the conversion of the polymer of the preceding example into a polymer having a higher degree of polymerization.

The polymer of Example II is heated for 30 minutes at 270° C., at which temperature the polymer is fused. The product now has an intrinsic viscosity, as determined in meta-cresol, of 0.60 and, when molten, can be drawn out to short filaments by touching the molten mass with a cold rod and withdrawing the rod.

Anal. calc'd. for $[C_{12}H_{22}O_2N_2]_x$: N, 12.38. Found: N, 11.89.

*Example IV*

This example illustrates the preparation of a polymer having excellent fiber-forming properties from a polymer having only mediocre fiber-forming properties.

The polymer, prepared as described in Example III, is heated for 1 hour at 270° C., at which temperature the polymer is fused. When molten, the polymer can now be drawn out to filaments by touching the molten mass with a cold rod and withdrawing the rod. The filaments can be cold-drawn. Both the drawn and undrawn filaments possess considerable strength.

*Example V*

This example illustrates the preparation of a low molecular weight polymer from monomeric reactants.

To 55.02 parts of glutaric acid is added 83.42 parts of hexamethylene diisothiocyanate in an atmosphere of dry nitrogen. These are heated for 6 hours at 130–180° C. and for 20 minutes at 250° C. The product softens at 200° C. and melts at 205° C. This polymer is soluble in hot alcohol and has no fiber-forming properties. The molecular weight of this polymer is 460, as determined by the boiling point elevation of alcohol.

Anal. calc'd. for $[C_{11}H_{20}O_2N_2]_x$: N, 13.19. Found: N, 12.80.

*Example VI*

This example illustrates the preparation of a polyamide from monomeric reactants.

To 45.52 parts of sebacic acid is added 50.49 parts of decamethylene diisocyanate in an atmosphere of dry nitrogen. These are heated for 1 hour at 170° C., during which time the reactants dissolve and then solidify. The heating is continued for 3 hours at 210° C. to 220° C., during which time the polymer is molten. The cold product is a hard, tough, cream-colored polymer melting at 189° C., and having an intrinsic viscosity of 0.37. Filaments may be drawn by touching a cold rod to a molten mass of the polymer and withdrawing the rod. The filaments can be cold-drawn. The drawn and undrawn filaments possess considerable strength.

Anal. calc'd. for $[C_{20}H_{28}O_2N_2]_x$: N, 8.28. Found: N, 7.77.

*Example VII*

This example illustrates the condensation of an unsaturated acid with a diisocyanate.

To 47.14 parts of dihydromuconic acid (HOOCCH₂CH=CHCH₂COOH) is added 73.38 parts of decamethylene diisocyanate in an atmosphere of dry nitrogen. These are heated for 20 minutes at 150° C., and then for 45 minutes at a temperature of 150° C. to 280° C. The product is an insoluble polymer softening at 160° C. and melting at 320° C.

Anal. calc'd. for [C₁₆H₂₈O₂N₂]ₓ: N, 9.99. Found: N, 9.40.

Among the diisocyanates useful in the practice of this invention there may be mentioned polymethylene diisocyanates such as ethylene diisocyanate, trimethylene diisocyanate, tetramethylene diisocyanate, hexamethylene diisocyanate; alkylene diisocyanates, such as propylene-1,2-diisocyanate, butylene-1,2-diisocyanate, butylene-1,3-diisocyanate, butylene-2,3-diisocyanate; alkylidine diisocyanates such as ethylidene diisocyanate (CH₃CH(NCO)₂), propylidene-1,1-diisocyanate, (CH₃CH₂CH(NCO)₂), propylidene-2,2-diisocyanate (CH₂C(NCO)₂CH₃); cycloalkylene diisocyanates such as cyclopentylene-1,3-diisocyanate, cyclohexylene-1,2-diisocyanate, cyclohexylene-1,3-diisocyanate, cyclohexylene-1,4-diisocyanate; cycloalkylidene diisocyanates such as cyclopentylidene diisocyanate ((CH₂)₄C(NCO)₂) or cyclohexylidene diisocyanate ((CH₂)₅C(NCO)₂); aliphatic-aromatic diisocyanates such as xylylene-1,4-diisocyanate, or xylylene-1,3-diisocyanate, and hetero-atom diisocyanates such as OCN(CH₂)₃O(CH₂)₃NCO. In fact any diisocyanate of the general formula OCNRNCO, in which R is a divalent organic radical not carrying a functional group or groups, other than the two isocyanate groups, which will react with an isocyanate group or a carboxylic acid group under the conditions of polymer formation, will condense with a wide variety of dicarboxylic acids to give polyamides.

Diisothiocyanates containing the radicals mentioned above for diisocyanates may be used. In these compounds, also, these radicals should not carry a functional group or groups, other than the two isothiocyanate groups, which will react with an isothiocyanate group or a carboxylic acid group under the conditions of polymer formation.

The dicarboxylic acids mentioned in the examples may be replaced by a large number of compounds which include the following: carbonic acid, oxalic acid, malonic acid; polymethylene dicarboxylic acids such as succinic acid, pimelic acid, suberic acid, azelaic acid, decane-1,10-dicarboxylic acid, etc.; substituted dicarboxylic acids such as methyl malonic acid and β-methyl adipic acid; unsaturated acids such as maleic acid, itaconic acid (HOOCC(=CH₂)CH₂COOH)

acetylene dicarboxylic acid, etc.; cycloalkylene dicarboxylic acids such as cyclopentane-1,2-dicarboxylic acid, cyclopentane-1,3-dicarboxylic acid, cyclohexane-1,2-dicarboxylic acid, cyclohexane-1,3-dicarboxylic acid, cyclohexane-1,4-dicarboxylic acid, etc.; aromatic dicarboxylic acids such as phthalic acid, isophthalic acid, terephthalic acid, diphenic, naphthalene-1,2-dicarboxylic acid, naphthalene-1,3-dicarboxylic acid, naphthalene-1,4-dicarboxylic acid, naphthalene-1,5-dicarboxylic acid, diphenylene-2,2'-dicarboxylic acid, diphenylene-4,4'-dicarboxylic acid, diphenylene-2,4'-dicarboxylic acid, etc.; aliphatic-aromatic dicarboxylic acids such as xylylene-1,4-dicarboxylic acid, xylylene-1,3-dicarboxylic acid, xylylene-1,2-dicarboxylic acid;  and dicarboxylic acids containing hetero-atoms such as HOOC(CH₂)₃S(CH₂)₃COOH, etc. In fact there may be mentioned as generally operable dicarboxylic acids those of the general formula HOOCRCOOH, in which R is a divalent radical Substances in which the complementary amide-forming groups are contained in the same molecule, namely, the isocyano- or isothiocyano-monocarboxylic acids include compounds such as 6-isocyanocaproic acid, 10-isocyanodecanoic acid, 3-(isocyanomethyl) benzoic acid, and 4-(isocyanomethyl) α-naphthalene carboxylic acid and the corresponding isothiocyanates.

The polymerizations may be conducted either in the presence or absence of solvents or diluents and in either open or sealed vessels. The reactions are preferably conducted in the absence of oxygen or moisture which may be accomplished either by operating in a partial vacuum or in the presence of an inert gas such as nitrogen. Although the preferred embodiment of this invention comprises heating the reactants until they exhibit fiber-forming properties, it is within the scope of this invention to discontinue heating before that stage is reached. The superpolyamide or fiber-forming polyamide, may be prepared from a polyamide of lower degree of polymerization. Interpolyamides may be prepared by using a mixture of reactants, e. g. two dicarboxylic acids and two diisocyanates. Amide interpolymers may be obtained by including with the reactants described herein bifunctional reactants of other types, such as hydroxyacids or glycols which are referred to in the above mentioned patents as useful in the production of synthetic linear polymers. Lower molecular weight, viscosity-stabilized polymers, capable of remaining unchanged under continued conditions of heating as in spinning, film-pressing, or compounding can be prepared by adding one reactant in excess of the chemically equivalent amount. A small amount of monocarboxylic acid or a monoisocyanate or monoisothiocyanate may also be used to accomplish this purpose.

The highly polymerized products of this invention are useful in the manufacture of fibers, filaments, bristles, films, etc. The lower molecular weight products are useful in making organic pigments by addition of a dyestuff thereto and, because of their greater solubilities, may be used in solutions as for impregnating fabrics to impart stiffness or water repellency.

The present invention provides a new method, involving reactants different from those heretofore used, for the manufacture of the valuable linear polyamides. In the present process carbon dioxide or carbon oxysulfide are the only by-products formed. These by-products are more readily volatilized and removed from the reaction mixture than the by-products (water or alcohol) formed in other methods of preparing polyamides. A further advantage of this invention resides in the fact that the polymer may be heated in the presence of the by-product without danger of hydrolysis and so brought to a high degree of polymerization more quickly than in the case of other methods of preparation.

As many apparently widely different embodiments of this invention may be made without departing from the spirit and scope thereof, it is to be understood that I do not limit myself to the specific embodiments thereof except as defined in the appended claims.

I claim:

1. A process for making linear polymers which comprises heating to reaction temperature a polyamide-forming composition comprising essentially reacting material in which each molecule has two and only two reactive groups, said groups being amide-forming groups each of which is complementary to one of the amide-forming groups in other molecules, said groups being selected from the class consisting of carboxylic, isocyanate, and isothiocyanate groups.

2. The process set forth in claim 1 in which the reaction is continued until the polymer is capable of being formed into fibers showing by characteristic X-ray diffraction patterns orientation along the fiber axis.

3. A process for making linear polymers which comprises heating at polymerization temperatures a dicarboxylic acid of the formula HOOCRCOOH and a compound of the formula XCNR'NCX, R and R' being divalent organic radicals free from reactive groups and X being an element of the group consisting of oxygen and sulfur.

4. The process set forth in claim 3 in which said dicarboxylic acid is adipic acid and said compound has the formula $XCN(CH_2)_6NCX$.

5. A process for making linear polymers which comprises heating at polymerization temperatures a compound of the formula XCNR''COOH in which R'' is a divalent organic radical free from reactive groups and X is an element of the group consisting of oxygen and sulfur.

6. The process set forth in claim 3 in which R and R' are divalent hydrocarbon radicals.

7. The process set forth in claim 5 in which R'' is a divalent hydrocarbon radical.

8. The process set forth in claim 3 in which said compound is a diisocyanate.

9. The process set forth in claim 3 in which said dicarboxylic acid is adipic acid and said compound is hexamethylene diisocyanate.

LUCIUS GILMAN.